Jan. 12, 1932.　　G. A. EICHELBERGER　　1,840,705
VEHICLE CARRYING TRAILER
Filed July 2, 1930　　2 Sheets-Sheet 1
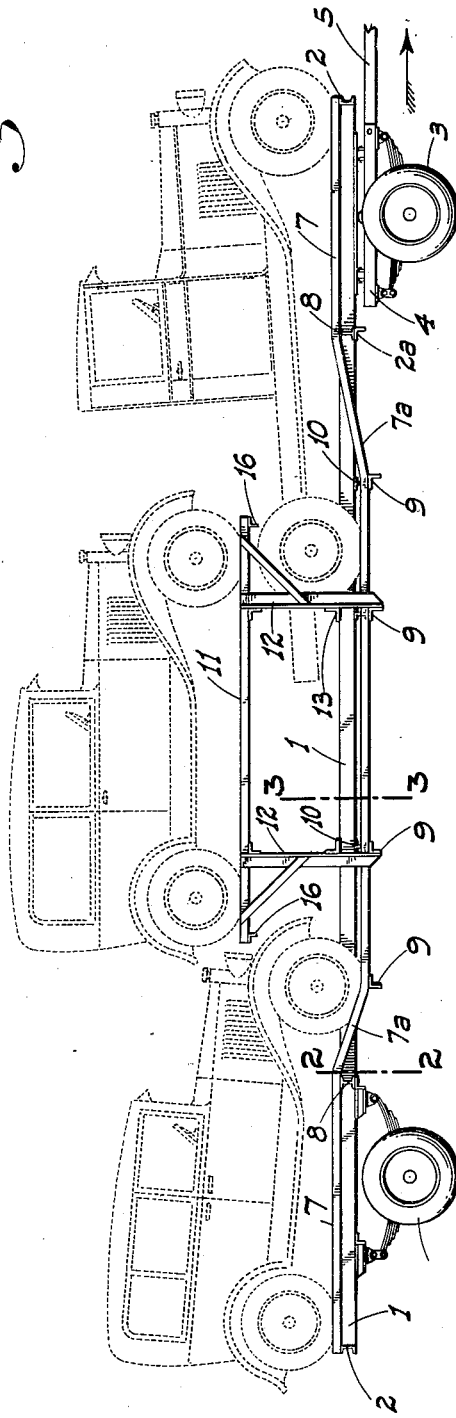
INVENTOR
G. A. Eichelberger
BY
ATTORNEY

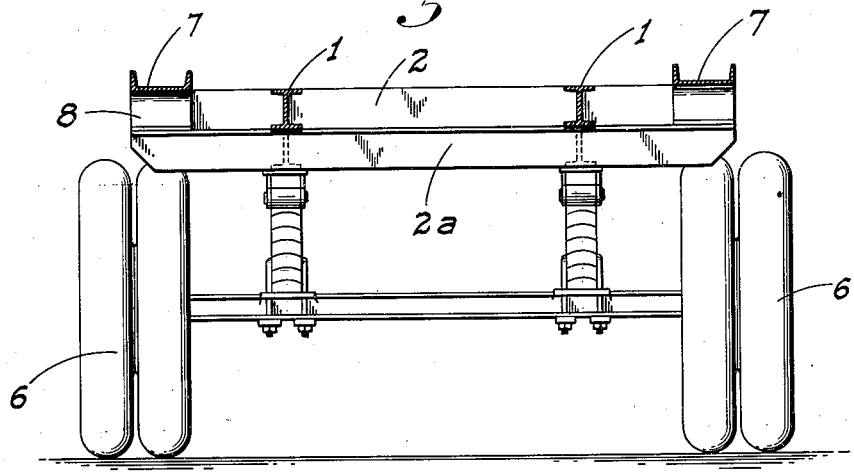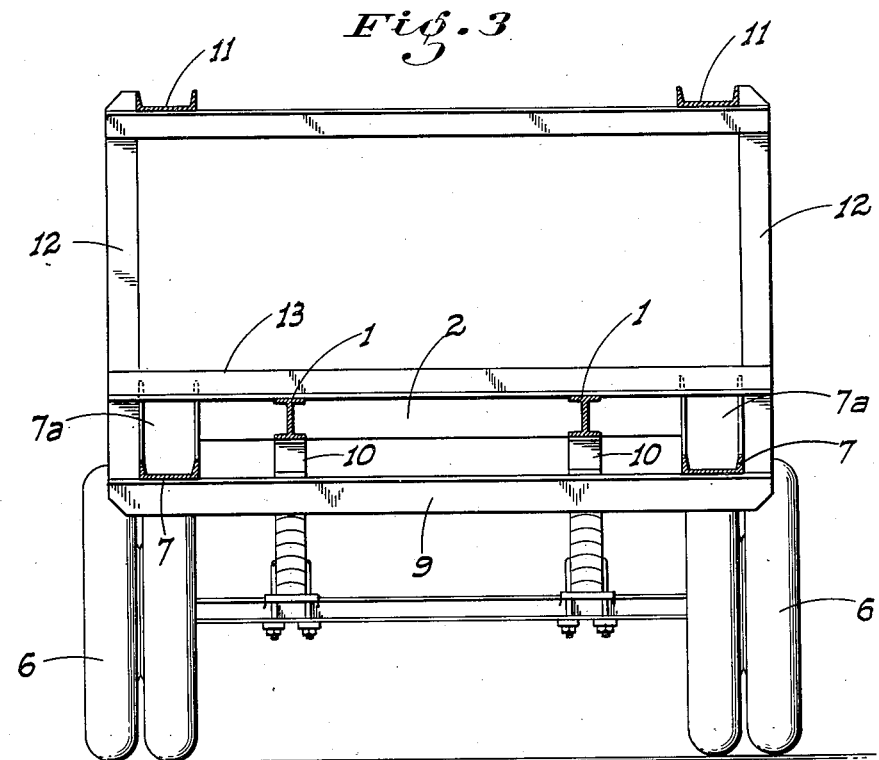

Patented Jan. 12, 1932

1,840,705

UNITED STATES PATENT OFFICE

GAYLERD A. EICHELBERGER, OF STOCKTON, CALIFORNIA, ASSIGNOR OF ONE-HALF TO C. M. MENZIES, OF STOCKTON, CALIFORNIA

VEHICLE CARRYING TRAILER

Application filed July 2, 1930. Serial No. 465,263.

This invention relates to motor driven trailers, my principal object being to provide a trailer especially designed for the simultaneous transportation of a plurality of new automobiles in such a manner that such vehicles occupy a minimum of space both horizontally and vertically, so that the trailer is not excessively long nor is it and its load so high as to be inclined to be top-heavy.

The use of this trailer, which is especially adapted for relatively light cars, such as are more apt to be delivered in quantities to the different agents from the factory or distributing plant than larger and heavier cars, does away with the necessity of running the cars under their own power from the point of distribution to their final destination. This practice which has heretofore been deemed necessary is objectionable for several reasons. There is danger of damage being done to the cars while they are on the road due to accidents of one kind or another; they must of necessity be driven very slow to avoid overheating, which adds to the already congested condition of the highways; and the necessity of having a driver for each car ties up his services an inordinately long time and increases the operating or overhead expense of the distributor or agent by reason of the high labor costs thus incurred.

With my improved trailer the cars are only run under their own power while being loaded on and removed from the trailer; the speed of the latter being only limited by the speed and power of the vehicle used in hauling the trailer and of course only one man is needed to drive such vehicle.

Another objective leading to the development of the trailer was the desire to avoid conflict with the laws of this and possibly other States, which prohibit the use of a truck and trailer unit of over a certain number of feet in overall length. In this State the limit is sixty feet, which would prevent the direct longitudinal alinement of the desired number of vehicles being transported in addition to the truck, and even if legal, would make the trailer excessively long from the standpoint of convenience in handling the same on the road.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved trailer showing the same as loaded.

Fig. 2 is an enlarged cross section on the line 2—2 of Fig. 1.

Fig. 3 is a similar view on the line 3—3 of Fig. 1.

Fig. 4 is a perspective view of a runway used in loading and unloading the upper track of the trailer.

Referring now more particularly to the characters of reference on the drawings, the main frame of the trailer comprises longitudinal main beams 1 which are straight from end to end. The beams 1 are somewhat closer together than the normal automobile wheel tread, and are connected at their ends by cross beams 2 and intermediate their ends by similar beams 2a, all of which beams extend beyond or outwardly of the beams 1. Said cross beams 2 are on the same level as the beams 1 but the intermediate cross beams 2a are below the same. This frame is supported adjacent its forward end by wheels 3 mounted on a turntable or fifth wheel structure 4, which is provided with a tongue 5 or the like for attachment to the hauling truck or other vehicle. Adjacent its rear end the frame is supported by other wheels 6 mounted in a non-steering manner as usual.

Extending lengthwise of and outwardly of the beams 1 are upwardly facing channel beams 7, which are spaced apart to form a supporting track for the wheels of the automobile to be loaded on the trailer. The end portions of these channels are horizontal with their bottom surfaces on a level with the top of the beams 1, so that they rest on the cross beams 2 and on spacer blocks 8 disposed between said channels and the cross beams 2a.

Just below said beams 2a the channels slope downwardly for a short distance as at 7a and then extend horizontally and at a level somewhat below that of the beams 1. At the lower end of the sloping portions 7a and at intervals along the relatively low straight central portion, other cross beams 9 extend under said channels and the beams 1. These cross-beams are directly secured to the channels and are secured to the beams 1 by spacer blocks 10 disposed therebetween. The channels are symmetrically shaped relative to both ends and their overall length while greater than that of two vehicles of the particular type which the trailer is designed to carry, is shorter than the length of three vehicles. The length of the straight end portions of the channels is less than the wheel base of such vehicles, so that when one pair of wheels of a vehicle is resting on the track adjacent the ends of the same, the other pair of wheels engages the track beyond the sloping portion or on the central horizontal portion of the same. The vehicles therefore have a downward slope from the ends of the trailer toward the center as shown.

To permit the trailer to carry a third vehicle of the same length as the other two, I provide another pair of channel members 11 a little longer than the wheel base of such vehicle and disposed over the central portion of the track below. The channels 11 form an upper track and are supported by uprights 12 disposed outside the channels 7 and extending alongside and secured to certain ones of the cross beams 9. These uprights are additionally connected to the main beams 1 by cross beams 13 extending over and resting on said beams 1. The height of the upper track above the frame and lower track is only sufficient to clear the front end of a passenger car, or the rear wheels of a truck chassis, as shown.

The particular shape and positioning of the lower channels 7 relative to the frame and the upper track serves three purposes. In the first place it permits of the vehicle supported thereon to have a downward slope away from the ends of the trailer and thus enables the height of the upper track to be kept lower, while overhanging the cars below, than would otherwise be possible. This consequently reduces any tendency to top heaviness. In the second place the cars having this slope toward the center of the trailer there is no tendency for them to roll off the ends of the trailer. In the third place the track forms a truss with the beams 1 and the latter are consequently braced against deflection, and additional bracing which would increase the cost and weight of the trailer is rendered unnecessary.

In loading the cars onto the trailer the upper track is of course loaded first. This is done with the aid of a detachable runway track 14 placed to extend from either end of the lower track to the adjacent end of the upper track, and alined with said tracks. At its upper end this runway is provided with hangers 15 arranged for detachable engagement with cross beams 16 which connect the track beams 11 at their upper ends and are under the same. A similar runway is of course used in running the cars from the ground onto either of the tracks 7. The cars when thus loaded are chocked against longitudinal movement and are also tied down to the main frame or the cross beams by chains or the like so that there is no possibility of the cars shifting while being transported.

From the foregoing description it will be readily seen that I have produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A vehicle carrying trailer including a wheel supported frame, wheel supporting tracks supported by said frame, and of a length to guide and support the wheels of a pair of automobiles in longitudinally alined but spaced relation to each other, and additional relatively short tracks to support the wheels of a third car mounted in connection with the frame above the first named tracks centrally between the ends thereof.

2. A structure as in claim 1, in which the central portion of the lower tracks is on a lower level than the end portions thereof; the length of said tracks from either end to the adjacent end of said central portion being less than the wheel-base length of an automobile for transporting which the trailer is designed.

3. A vehicle carrying trailer including a wheel supported frame, which includes longitudinal side beams, transversely spaced wheel-supporting tracks extending from end to end of the beams, said tracks for a certain distance from their ends being on a higher level than the beams and along their central portion being on a lower level than the beams, and cross-beams under and extending between the tracks at intervals and rigidly connected to the side beams.

4. A vehicle transporting device comprising a wheel supported frame, tracks spaced transversely to correspond to the wheel-tread spacing of the vehicles to be transported supported by said frame and extending from one end of the same and of a length sufficient to engage the front and rear wheels of such vehicle, and an upper pair of tracks supported by the frame at a height above the lower tracks less than that of the greatest height of a vehicle; said upper tracks having their inception a distance from the outer end of said lower tracks, less than the full length of a vehicle.

5. A structure as in claim 4, in which the lower tracks, adjacent and rearwardly of the plane of inception of the upper tracks, extend on a downward slope.

6. A structure as in claim 4, with a detachable runway track unit arranged to be removably supported by and extend between one end of the upper track and the lower track toward its outer end in transverse alinement with both tracks.

In testimony whereof I affix my signature.
GAYLERD A. EICHELBERGER.